Figure 1:
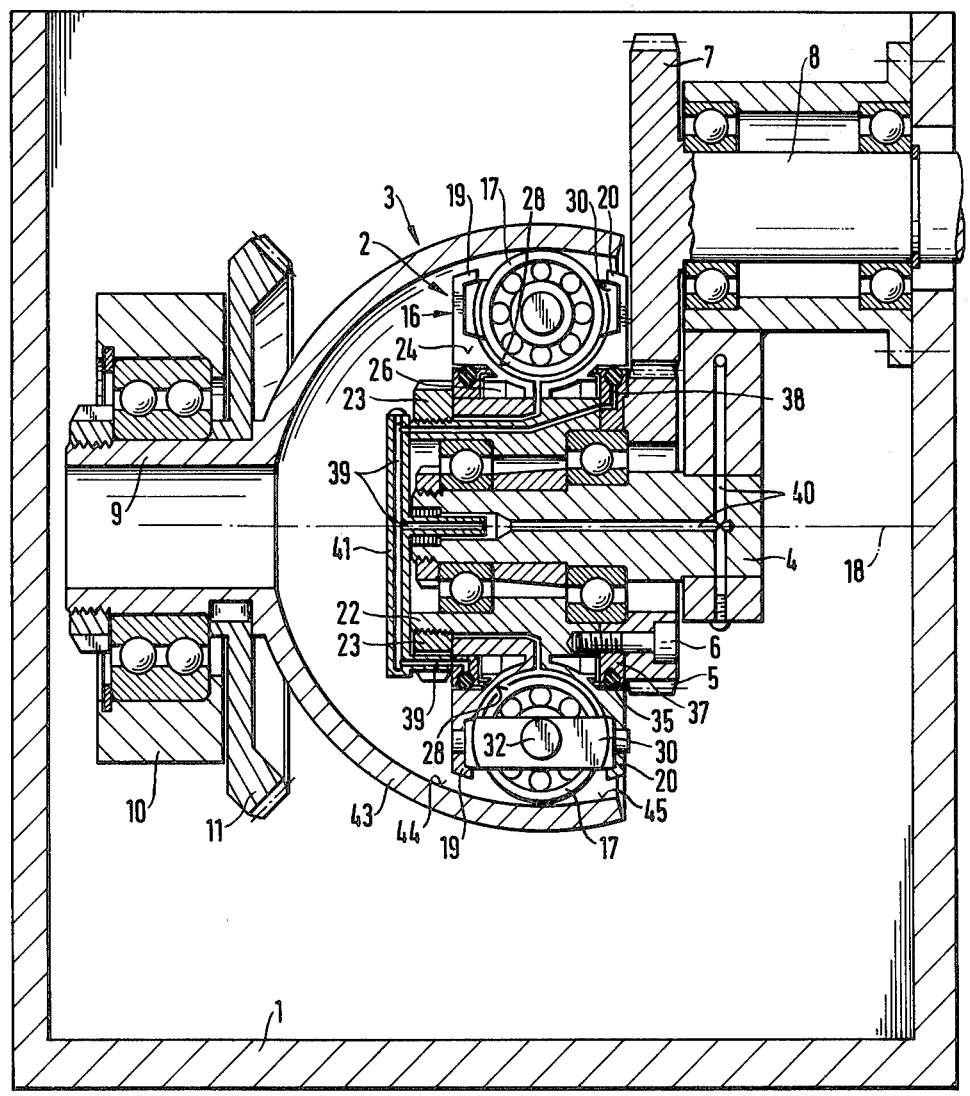

United States Patent [19] [11] Patent Number: 4,487,086
Broziat [45] Date of Patent: Dec. 11, 1984

[54] INFINITELY VARIABLE TRANSMISSION

[76] Inventor: Horst Broziat, Vorwerker Strasse 62a, D-2400 Lübeck, Fed. Rep. of Germany

[21] Appl. No.: 240,505
[22] Filed: Mar. 4, 1981
[30] Foreign Application Priority Data Mar. 7, 1980 [EP] European Pat. Off. ...... 80 101 167.7

[51] Int. Cl.³ ............... F16H 15/26; F16H 15/00; F16H 13/00
[52] U.S. Cl. ........................ 74/198; 74/190; 74/208
[58] Field of Search ............... 74/198, 190, 207, 208, 74/190.5, 200

[56] References Cited

U.S. PATENT DOCUMENTS

| 1,141,508 | 6/1915 | Weiss | 74/198 |
| 1,146,982 | 7/1915 | Weiss | 74/198 |
| 1,537,515 | 5/1925 | Weiss | 74/198 |
| 1,541,882 | 6/1925 | Weiss | 74/198 |
| 1,602,514 | 10/1926 | Weiss | 74/198 |
| 1,655,079 | 1/1928 | Weiss | 74/198 |
| 1,728,383 | 9/1929 | Weiss | 74/198 |
| 2,092,437 | 9/1937 | Weiss | 74/198 |
| 3,745,844 | 7/1973 | Schottler | 74/198 |
| 3,793,907 | 2/1974 | Nakamura et al. | 74/198 |
| 4,112,781 | 9/1978 | Baugh | 74/190 |
| 4,322,798 | 3/1982 | McCoin | 74/208 |

FOREIGN PATENT DOCUMENTS 1252866 12/1959 France .

46-28932 8/1971 Japan ..................... 74/198

Primary Examiner—Lawrence J. Staab
Assistant Examiner—Michael D. Bednarek
Attorney, Agent, or Firm—Balogh, Osann, Kramer, Dvorak, Genova & Traub

[57] ABSTRACT

The transmission is of the type in which a spherically curved working face (44) on one transmission member (3) and freely rotatable transverse rollers (17) on the other transmission member (2) of this pair of members are provided, the axes of rotation of the transverse rollers lying in a common plane and this plane running perpendicularly to the axis of rotation (18) of the element (3). The transverse rollers are engaged by means of frictional engagement with the working face for the purpose of torque transmission, a change of speed being effected by varying the relative position of the two members (2, 3).

In order to prevent an undesirable radial change in the axial position of the transverse rollers (17), a stop (42a, 72) which is preferably designed to be adjustable is provided. Furthermore, the transverse rollers are arranged in such a way that their axis of rotation can be varied at random, from outside the transmission, radially to the axis of rotation (18) of the carrier (16) having the transverse rollers. As a result, the frictional engagement of the rollers on the members (2, 3) can be interrupted and restored in any position of these members relative to one another.

8 Claims, 17 Drawing Figures

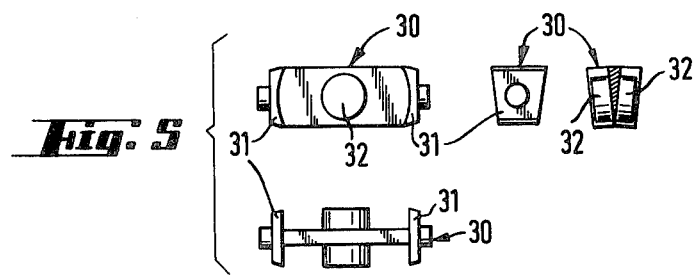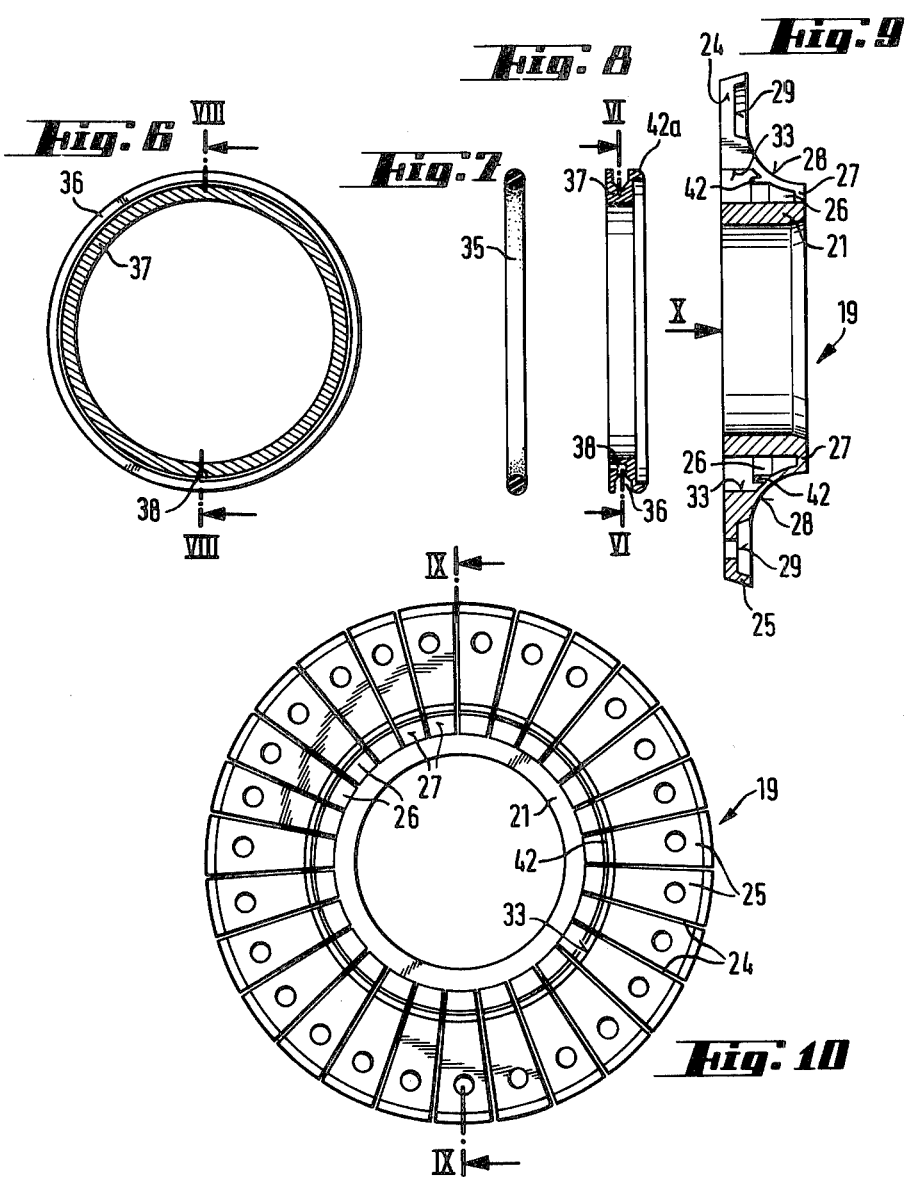

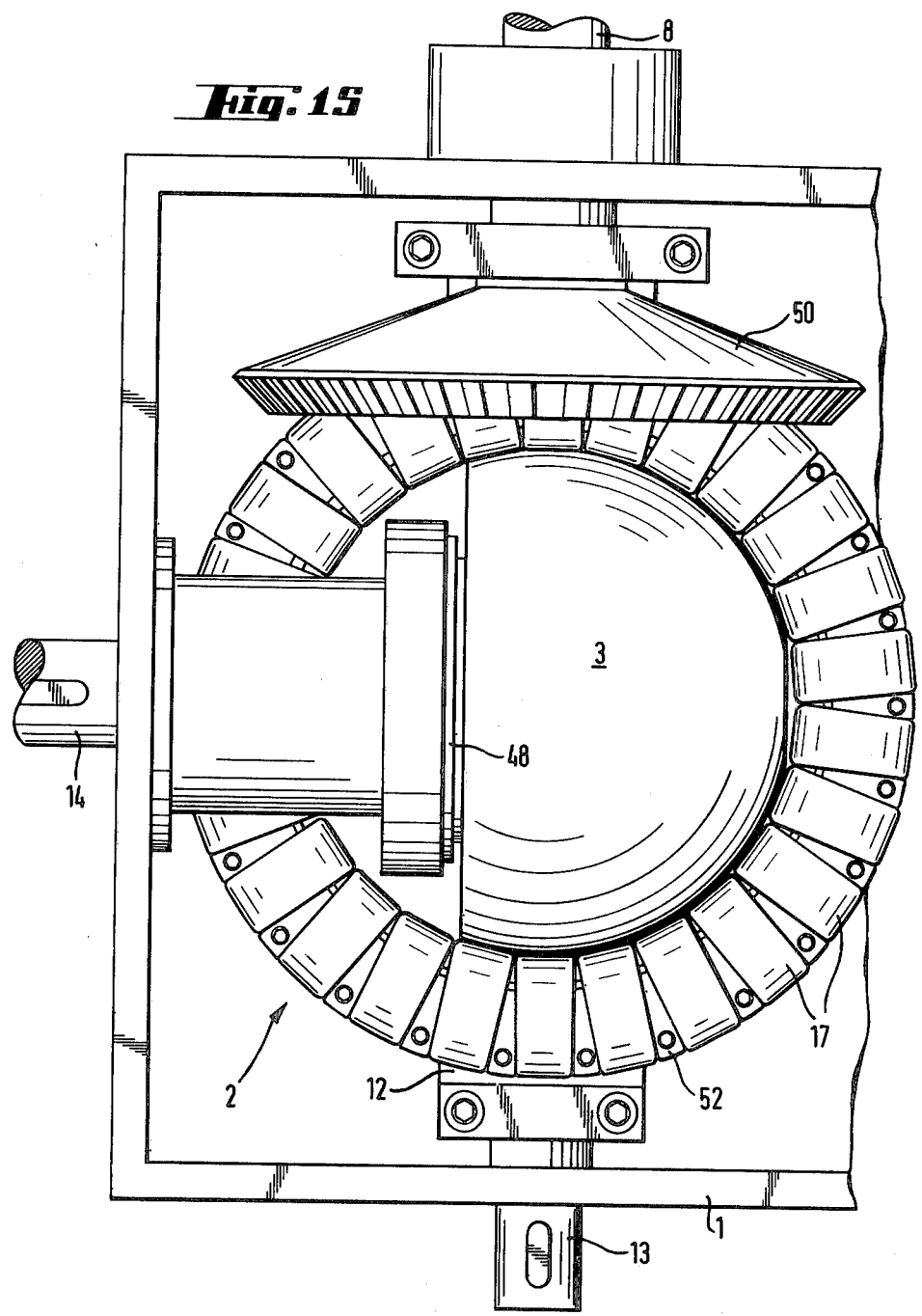

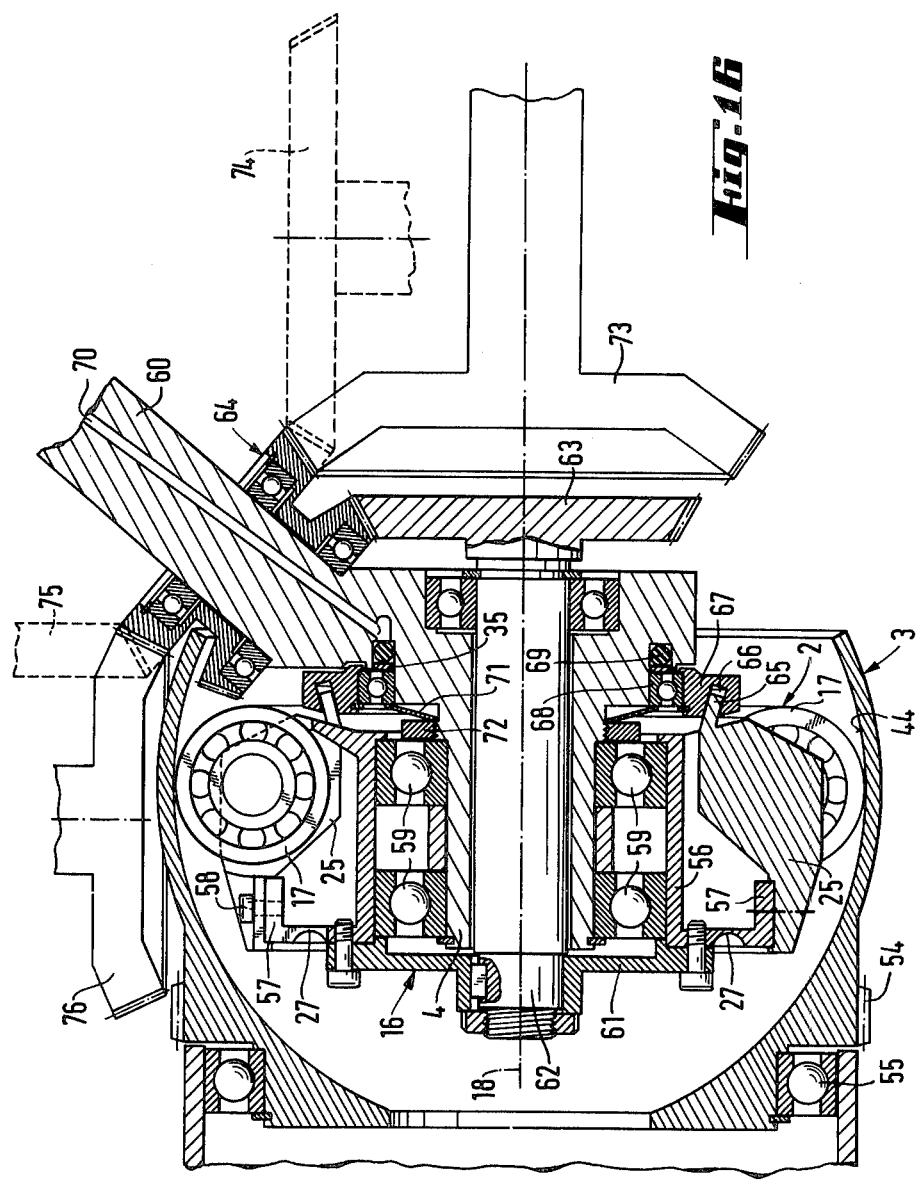

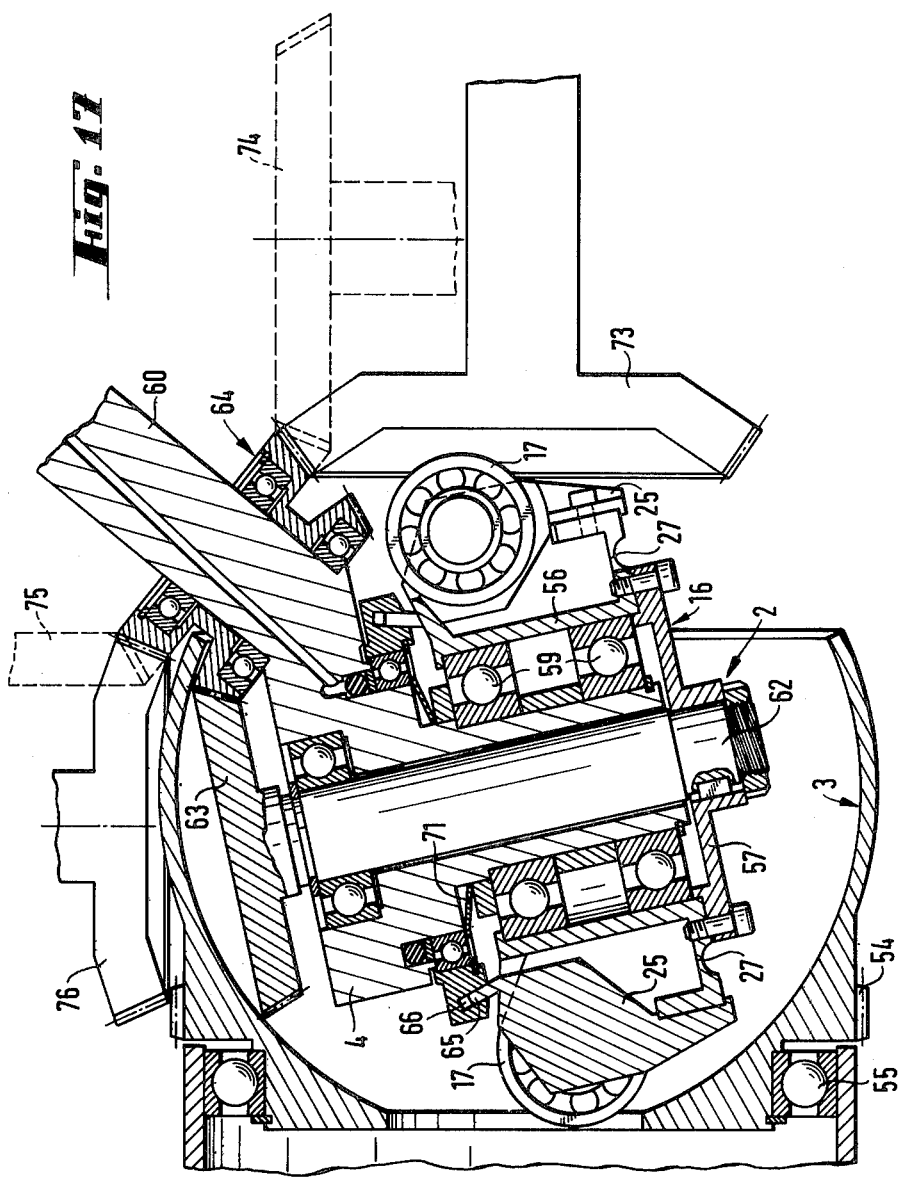

INFINITELY VARIABLE TRANSMISSION

The invention relates to an infinitely variable transmission with a first transmission member, the latter consisting of a rotatable carrier with freely rotatable transverse rollers which are arranged in a circle and the prolonged radial center plane of which passes through the axis of rotation of the carrier, and with a second transmission member having a spherically curved working face on which the transverse rollers engage frictionally, and the desired speed of the transmission member which is connected, at any given time, to the output shaft can be adjusted by changing the relative position of the two transmission members to one another.

A transmission of this type is described in French Patent Specification No. 1,252,806. In this transmission, the transverse rollers are constantly pressed, by means of spring force, against the spherically curved working face of the other transmission member, the spring being adjusted so that there is always sufficient normal pressure to maintain the frictional contact between the two transmission members. The effect of this relatively high and invariable normal pressure is that the transverse rollers which periodically come away from the spherical working face when the transverse-roller carrier is displaced and which are therefore briefly disengaged, are pressed radially further outwards by this normal pressure, due to lack of resistance, during the time when they are not engaged. When they re-enter the working face, signs of considerable wear, as well as appreciable running noise, occur at the re-entry points, despite a gentle transition. Furthermore, although it is possible, by means of this transmission, that, with the input speed unchanged, the output speed can be varied infinitely down from its maximum value to standstill and, with a reversal of direction of rotation of the output shaft being achieved simultaneously, can be varied up again to approximately 20% of the input speed value, nevertheless it is disadvantageous that a standstill of the output shaft can be obtained, when the input shaft is running, only if the speed is varied down to the indicated speed value 0, which is time-consuming and complicated.

The object of the invention is to provide a transmission of the type mentioned in the introduction, in which said wear and running noises are considerably reduced. Furthermore, it will be possible, at any speed value of the output shaft, to eliminate the frictional engagement between said transmission members and to restore this frictional engagement.

This object is achieved due to the fact that, in the abovementioned transmission, a stop is provided to limit the radial engaging movement of the transverse rollers of the transverse-roller carrier.

According to this feature, the radial further movement of the transverse roller is limited during the time when they are not engaged, so that the re-entry points on the spherical working face of the other transmission member, as well as the transverse rollers, are stressed mechanically to a lesser extent, as a result of which the wear, and the reduction in the running noises, at these points is considerably reduced. A further advantage of this feature is that a possible radial elongation of the spherical working face due to a strong pressing force of the transverse rollers against this face is likewise limited, as a result of which the transmission element having the working face is protected from an excessive bending load. In this respect, the stop according to the invention is of especially advantageous importance when the sections of the transverse-roller carrier which carry the transverse rollers are, according to a further feature of the invention, radially resilient.

According to a further feature of the invention, the axial position of the transverse rollers of the transverse-roller carrier can be varied radially at random.

It is thereby possible, in a simple way, to interrupt the frictional connection between the two transmission members, with the input speed unchanged and the output speed just set, so that the output shaft comes to a standstill immediately and does not first have to be varied down to the speed value 0 in the known way. When the frictional connection is to be restored, this is possible by varying in reverse the axial position of the transverse rollers of the transverse-roller carrier, and the output speed previously set is available again immediately.

One area of application of such a transmission is, for example, vehicle construction. Economical engines which have the disadvantage that they are relatively inflexible can be used. In conjunction with automatic transmissions, very economical running can be achieved. Furthermore, the transmission can be manufactured relatively cheaply, since standard parts are used to a great extent in its production. Moreover, it can be operated with currently conventional means for manual or automatic control. A further advantage is that the transmission can also be used as a variable speed transmission in control technology.

Figure 2:
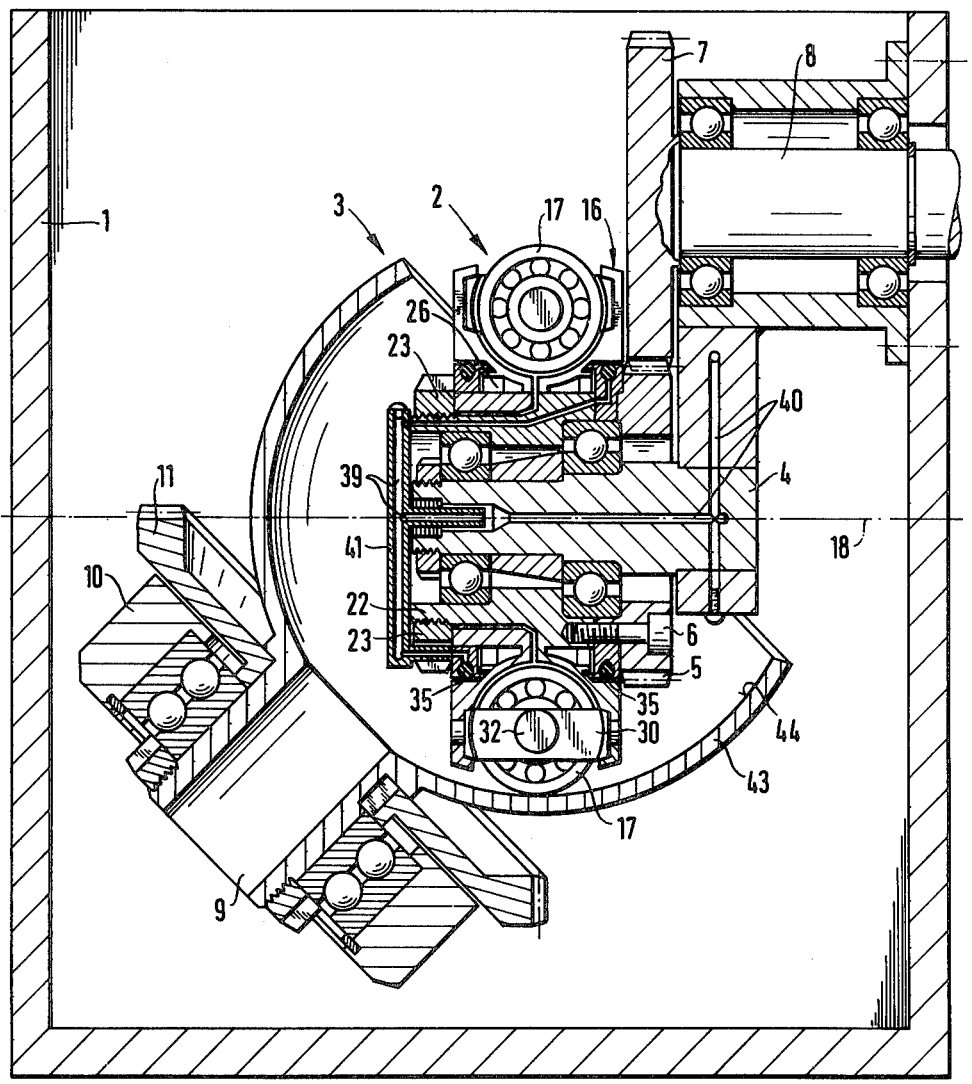
Figure 3:
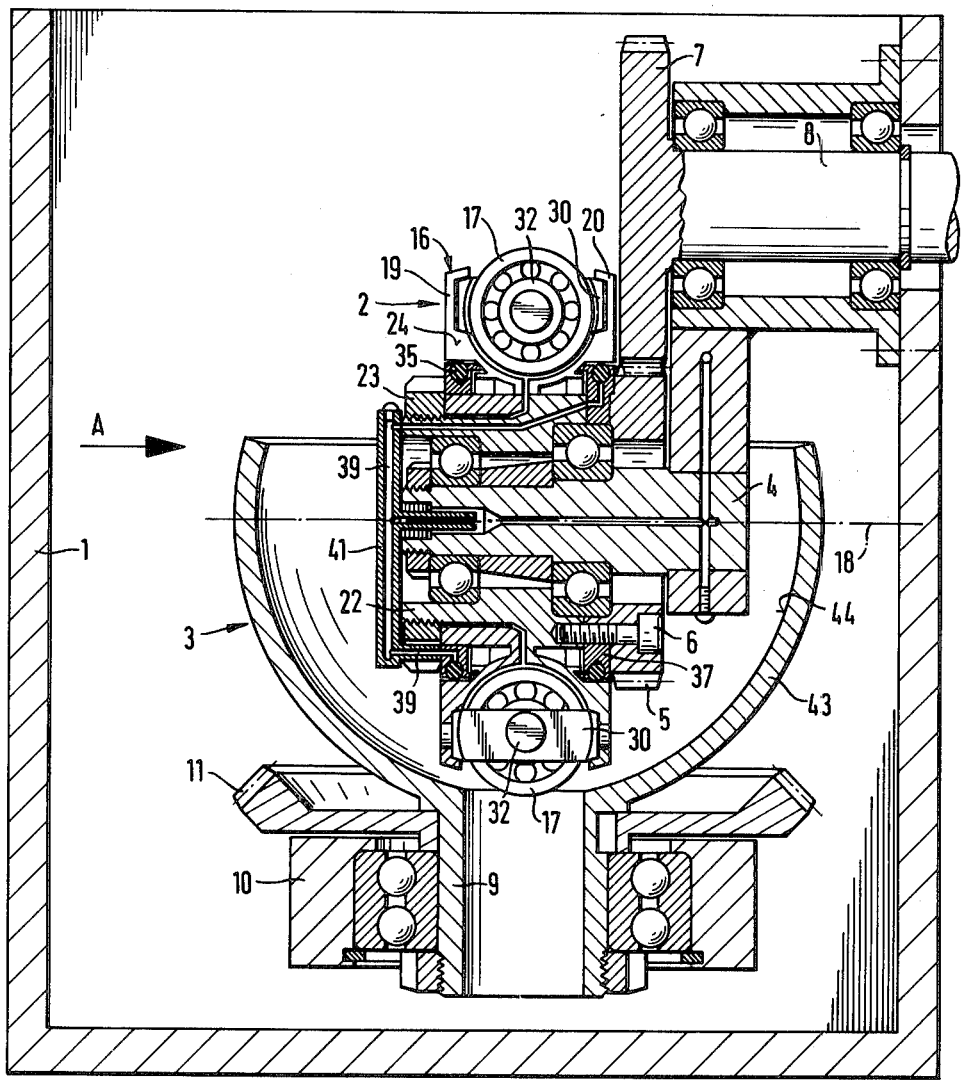
Figure 4:
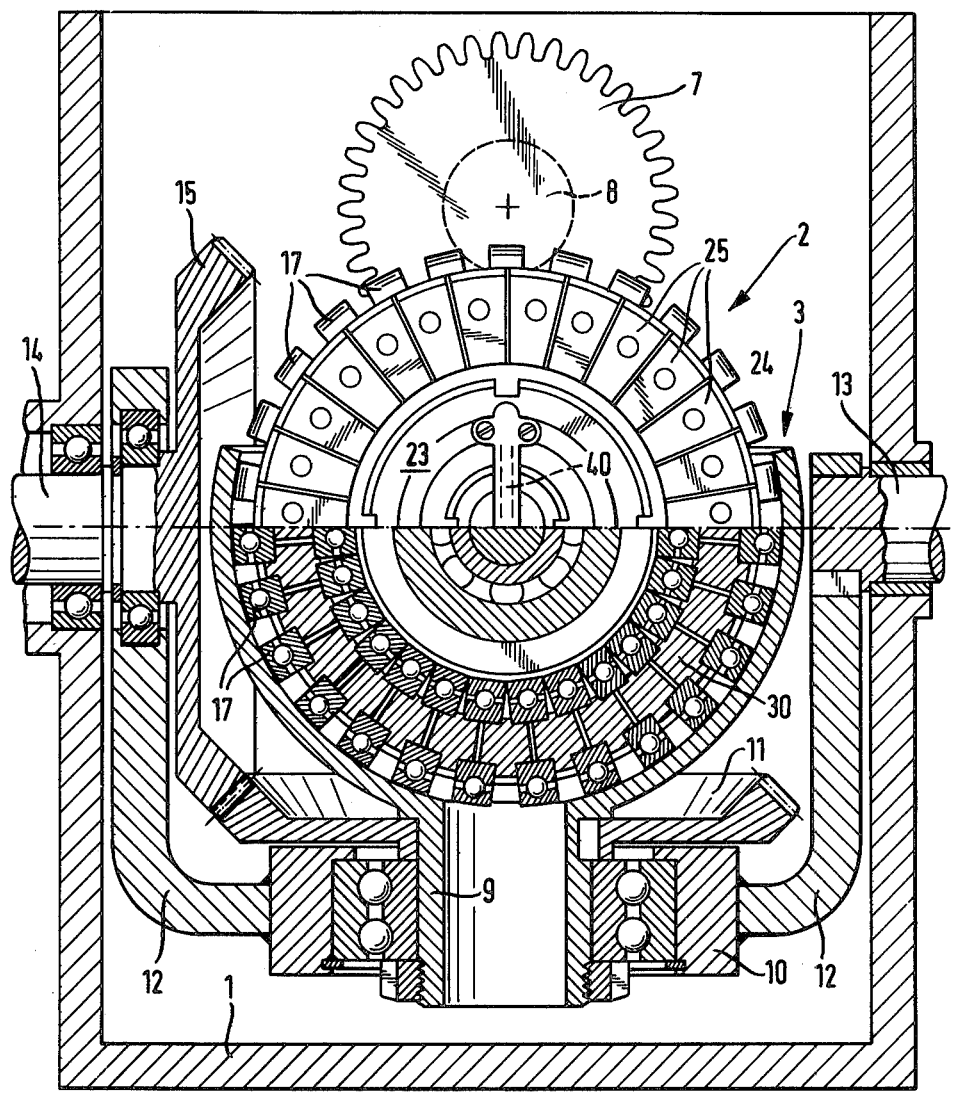
Figure 11:
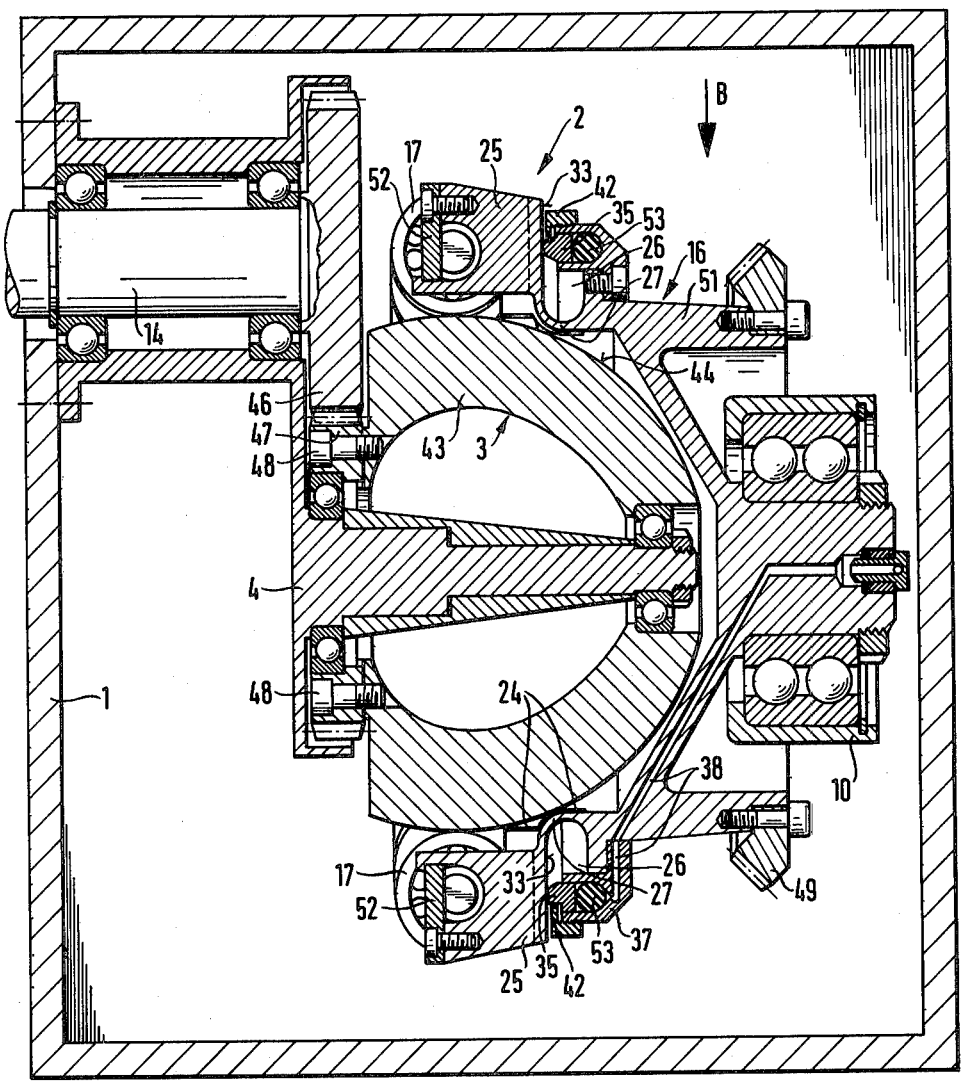
Figure 12:
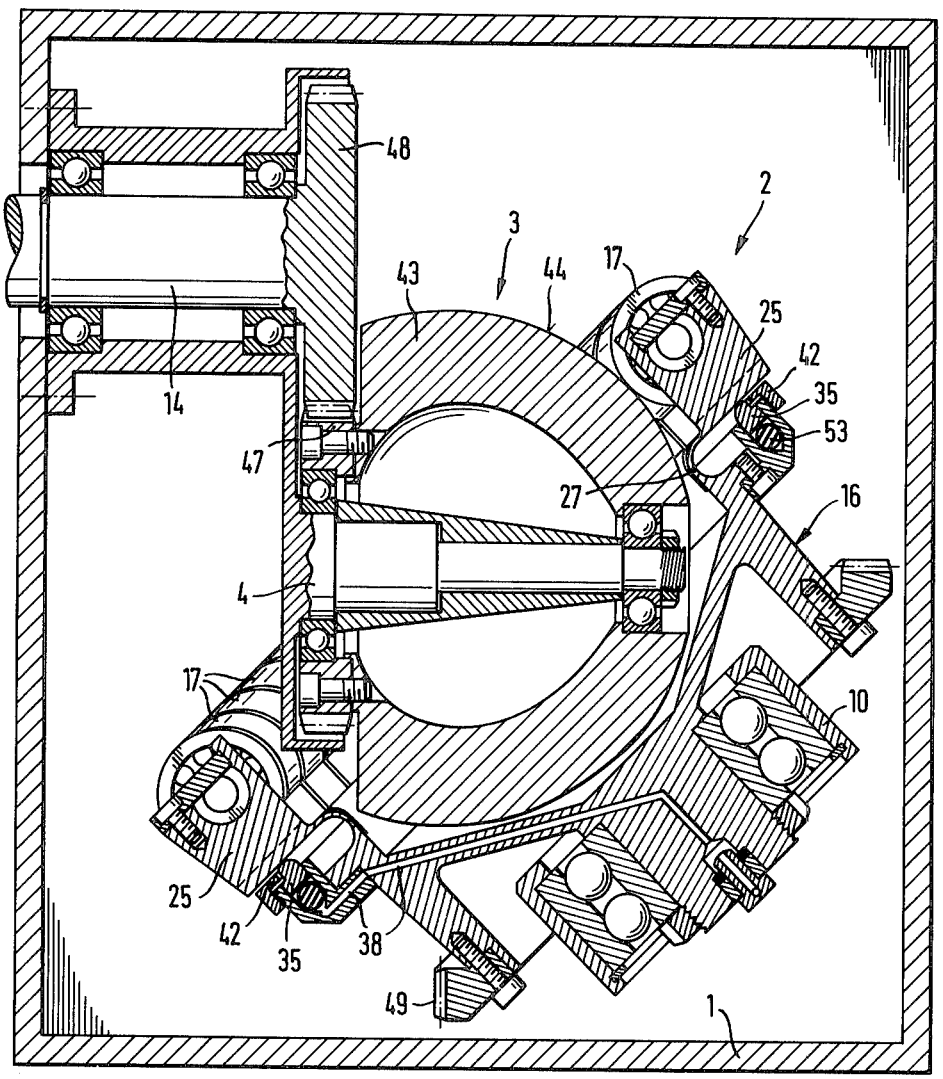
Figure 13:
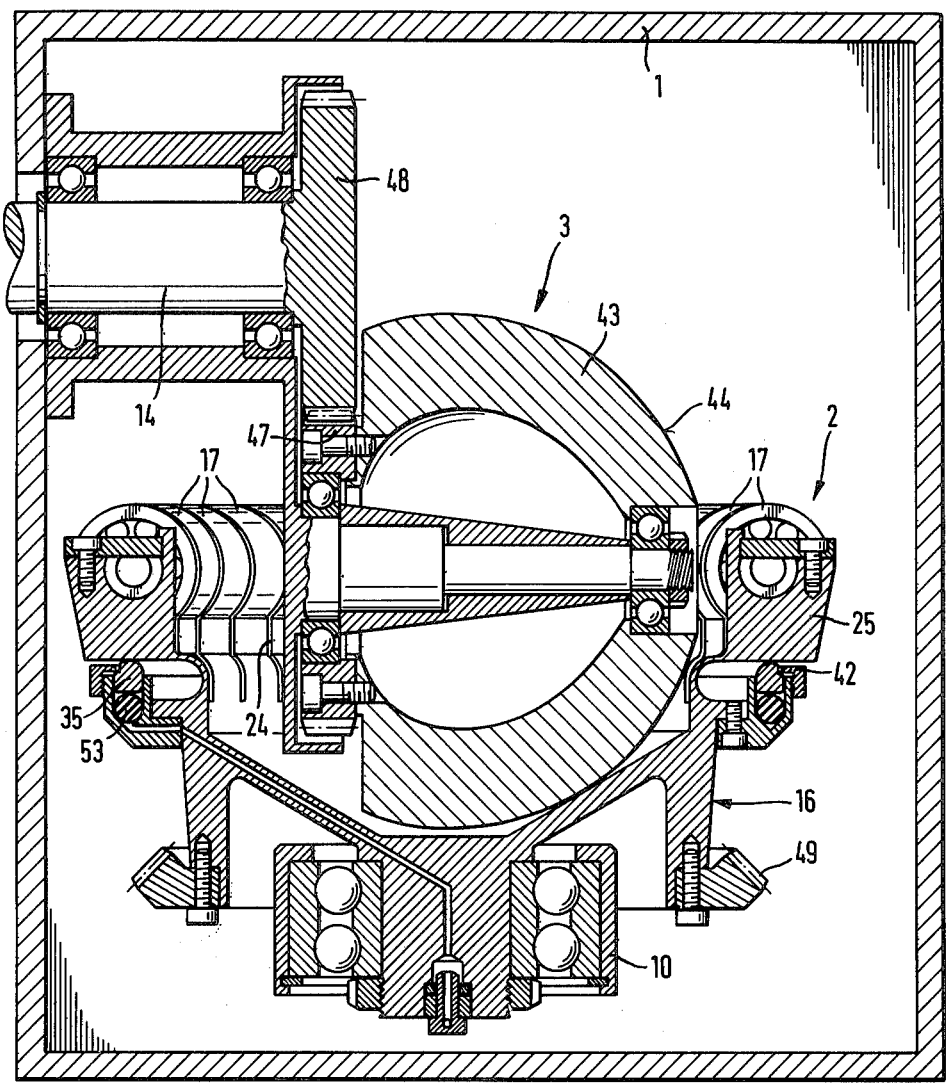
Figure 14:
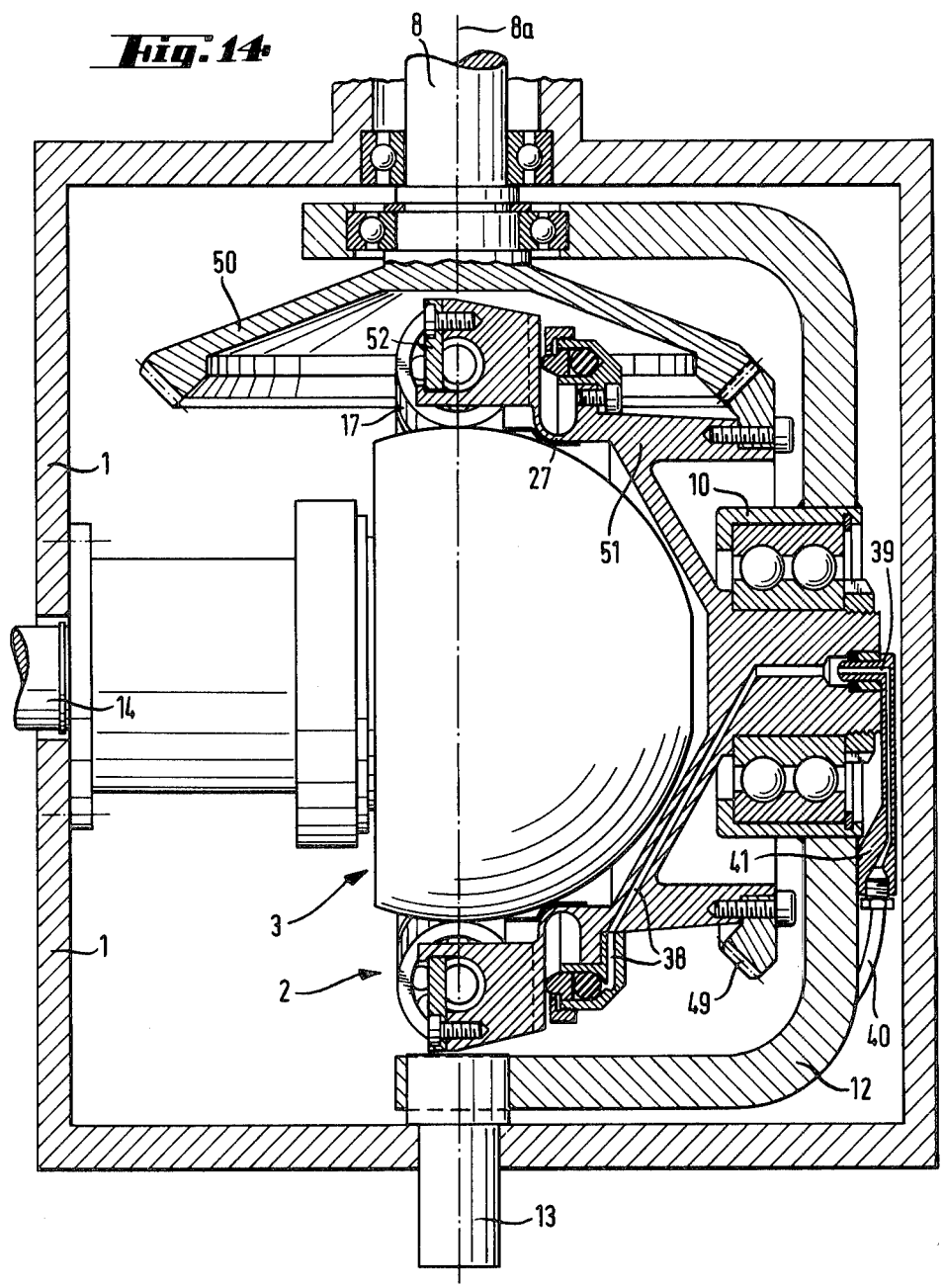

The invention is explained in more detail below with reference to several exemplary embodiments illustrated in the attached drawings, in which:

FIG. 1 shows a first embodiment of a transmission, in axial section, in a position in which the driving transmission member transfers its speed without change to the driven transmission member, FIGS. 2 and 3 show the embodiment according to FIG. 1, with a changed position of the driving transmission member, the output speed being reduced and zero respectively, FIG. 4 shows an illustration according to the arrow A in FIG. 3, partly in radial section and partly in a view, FIGS. 5–10 show indiviual parts of the driven transmission member, represented in section and in views, FIG. 11 shows a second embodiment of a transmission, in axial section, in the position for unchanged speed transmission, FIGS. 12 and 13 show the embodiment according to FIG. 11, with a changed position of the driven transmission member, the output speed being reduced and zero respectively, FIG. 14 shows an illustration according to the arrow B in FIG. 11, partly in section and partly in a view, FIG. 15 shows a view of the illustration according to FIG. 14, but in a position with the output speed at zero, FIGS. 16 and 17 show a further exemplary embodiment in axial section.

According to FIG. 1, the first embodiment of the transmission consists of the conventional housing 1 and has a first transmission member 2 and a second transmission member 3. For a clearer understanding, the mounting of the second transmission member 3 is indicated only partially in FIGS. 1 to 3; it is illustrated completely in FIG. 1.

The first transmission member 2 is supported rotatably on an axle body 4 connected rigidly to the housing 1 and is mounted on a spur gear 5, for example by means of screws 6. The gear 5 meshes with a further gear 7 which drives the output shaft 8 of the transmission. The second transmission member 3 is mounted freely rotatably in a hub 10 via a hollow shaft butt 9 and is rigidly connected to a bevel gear 11. In turn, the hub 10 is an integral part of a pivotable adjusting bracket 12 (FIG. 4) which is, on the one hand, rigidly fastened to an adjusting pin 13 mounted in the housing 1 and, on the other hand, mounted rotatably on the transmission input shaft 14 which also carries the bevel gear 15 for driving the bevel gear 11. The pivot axis of the bracket 12 passes through the axis of rotation of the transmission member 2. In this case, therefore, the second transmission member 3 is designed as the driving transmission member, whilst the first transmission member 2 is driven by the member 3.

In particular, the first transmission member 2 consists of a circular carrier 16 which has a plurality of transverse rollers 17 which are arranged in a circle and the prolonged radial center plane of which passes through the axis of rotation 1 of the carrier 16.

According to the first exemplary embodiment, the carrier 16 consists of two circular discs 19 and 20 which are mounted freely rotatably on the common axle body 4 and which are recessed, on their sides facing one another, in their peripheral region carrying the transverse rollers 17, in order to receive the transverse rollers. The construction of the circular disc 19 can best be seen in FIGS. 9 and 10. The disc 19 sits with its hub 21 on a hub extension 22 of the other disc 20 and is secured thereon by means of a grooved-ring nut 23 (FIG. 1). The discs 19,20 are divided into sector-shaped sections 25 by axis-parallel separating slots 24 which run radially inwards from the outer periphery of the discs, as emerges most clearly from FIGS. 9 and 10. Moreover, the peripheral region of the discs which carries the transverse rollers 17 is also shaped so that this region is recessed behind the hub 21, as is indicated at 26, namely in such a way that this region is connected to the hub 21 only via a narrow body cross-section 27 which is interrupted peripherally by the separating slots 24.

The discs 19, 20 also have the recesses 28 already indicated, to allow space for the transverse rollers 17 which can consist, for example, of deep-grooved ball bearings (FIGS. 1 and 9). The recesses 28 are provided with depressions 29 in which bearing bodies 30 for the transverse rollers are located. The construction of such a bearing body 30 is shown in detail in FIG. 5. It can be seen clearly that this body comes to rest with its end regions 31 in the depressions 29 of the discs 19,20 and has pins 32 on which rest the inner races of the transverse rollers 17.

Furthermore, the discs 19,20 each have a pressure face 33 (FIG. 9) which extends peripherally and is located on the sector-shaped sections 25 and against which a pressure body 35 which can consist, for example, of an O-ring made of rubber, shown in FIG. 7, can be brought to bear by the application of a hydraulic fluid, as will become clear. The pressure body 35 lies in an annular groove 36 of a retaining ring 37 (FIGS. 6 and 8), which is, in turn, inserted in the recesses 26 of the discs (FIG. 1).

Furthermore, there are provided for the hydraulic fluid, in the discs 19,20 and in the two retaining rings 37, feed channels 38 which are supplied via delivery channels 39 and 40. Whereas the stationary channel 40 runs in the axle body 4, the channels 38 of the discs and of the retaining rings are connected via the channels 39 of a connecting part 41 to the channel 40 which is mounted rotatably in the axle body 4 (FIG. 1).

The pressure body 35 constitutes, together with all the above-mentioned channels, including the hydraulic fluid, preferably a hydraulic oil, a pressure device which can be controlled from outside, to vary radially the axial position of all the transverse rollers 17 of the carrier 16 or of the discs 19,20. In the normal state, the transverse rollers 17 have no contact with the second transmission member 3. When the hydraulic fluid is pressurized, the two pressure bodies 35 are brought to bear against the pressure faces 33 of the discs and now press the sector-shaped sections 25 radially outwards a slight amount. The elastic resilience of the sections 25 is brought about by the dimensions of the relatively small connecting cross-sections 27 of the discs 19,20, taking into account the elasticity of the material, including the separating slots 24. The transverse rollers now have such a contact with the second transmission member 3 that this member can transmit its torque to the first transmission member by means of frictional engagement.

In order to limit the radial resilience of the sector-shaped sections carrying the transverse rollers, to prevent the two transmission members 2 and 3 from being destroyed, the discs 19,20 each have, in the region of the recesses 26, an annular projection 42 which projects axially. Correspondingly, the retaining rings 37 have an axially projecting stop 42a (FIGS. 8 and 9). The function of these parts emerges clearly from FIG. 1.

The second transmission member 3 consists of a hollow spherical part 43 which has on its inside the spherically curved working face 44. Because of the hollow shaft butt 9, there is no working-face region in the center of rotation of this part 43, and this is, also, not desirable for reasons of friction. The margin of the hollow sphere is provided on the inside with a slight peripheral chamfer 45 which widens outwards and which, during operation, makes it easier for the transverse rollers 17 to enter the hollow spherical part 43. Furthermore, it emerges from FIGS. 1–4 that, with the exception of the free region through the hollow shaft butt 9, essentially the entire inside of the hollow spherical part 43 is available as a working face. This provides the largest possible area of application of force to transmit the torque between the two transmission members 2 and 3.

FIGS. 11–15 illustrate a second embodiment of the transmission, the basic construction of which is identical to the embodiment described above, so that only the differing features are explained and designated by new reference numerals.

In this case, also, the second transmission member 3 is the driving member, but this has its spherical working face 44 on its outside on which the transverse rollers 17 of the first transmission member 2 engage frictionally. The other main difference is that the first transmission member is pivoted to vary the speed (FIGS. 12 and 13).

Firstly, the input shaft 14 is followed by a spur-gear stage consisting of the gears 46 and 47, the latter being connected by means of screws 48 to the spherical second transmission member 3. The gear 47, on the one hand, and the second transmission member, on the other hand, are mounted freely rotatably on the axle body 4. Screwed to the carrier 16 of the first transmission member 2 is a bevel gear 49 which meshes with the bevel gear 50 of the output shaft 8 (FIG. 14). The bracket 12 which carries the roller-borne carrier 16 of the first transmission member via the hub 10 is, in this case, mounted so that it can pivot about the axis of rotation 8a of the output shaft 8 (FIGS. 14 and 15).

Here, the carrier 16 is designed as a funnel-like body part 51 which surrounds with play the outer spherical working face 44 of the second transmission member 3 and the marginal region of which is fashioned, by means of the separating slots 24, in the form of sector-shaped sections 25. Corresponding recesses are provided in the sections 25 to receive the transverse rollers 17, including their bearing parts. Abutments 52 prevent the transverse rollers from falling out. The radial resilience of the sections 25 is also achieved here, by means of narrow connecting cross-sections 27 together with separating slots 24 and the elasticity of the material. The stop 42a is infinitely adjustable, since it is connected to the retaining ring 37 via a thread. The retaining rings 37 guides in its groove 36 the annular pressure body 35 which is pressed, by means of the hydraulic fluid fed into the channels 38, 39 and 40 and via a sealing ring 53, against the rear pressure faces 33 of the sector-shaped sections 25, when the frictional engagement of the transverse rollers 17 with the working face 44 is to be made. The transverse rollers then move radially inwards. Furthermore, in this embodiment also, essentially the entire outer surface of the spherical second transmission member 3 is used as a working face.

FIGS. 16 and 17 illustrate a further embodiment in which, again, the same reference numerals are used for the same parts.

Again, the transmission member 3 which has on the inside the spherical working face 44 serves as the driving transmission element, whilst the transmission member 2 is driven by this. When the transmission is employed in a motor vehicle or the like, the member 3 can be used instead of the engine flywheel and can have a starter gear-ring 54 and, if necessary, also a further pivot bearing 55.

The construction of the driven transmission member 2 is similar to that of the transmission member 2 in FIG. 1. The transverse-roller carrier 16 has a sleeve 56 which carries, via a radially slotted flange 57 with a reduced cross-sectional region 27, the sections 25 which are radially resilient as a result of this and carry the transverse rollers 17 and which are designed, in this embodiment, as separate parts and are connected to the flange 57 via screws 58.

The sleeve 56 is mounted by means of roller bearings 59 on the axle body 4 which is, in this case, designed as a bush and which is connected rigidly, at one end, to a governor shaft 60 inclined to the axis of rotation 18. The shaft 60 is mounted in the transmission housing which has been left out in this embodiment for the sake of clarity. Furthermore, the sleeve 56 is non-rotatably connected by means of a further flange 61, to a shaft 62 which passes centrally through the axle body 4 and which carries a bevel gear 63 at its other end. This bevel gear 63 transmits its rotary movement to a bevel-gear combination 64 which is mounted freely rotatably on the governor shaft 60 and from which the further power take-off is effected, as will be explained.

The radially resilient sections 25 of the transverse-roller carrier 16 have web portions 65 (FIG. 16) which are inclined at an acute angle to the axis of rotation 18 of the carrier 16 and which engage loosely into an annular groove 66 of a thrust ring 67 having the same inclination. The thrust ring 67 sits on a roller bearing 68 which, in turn, sits axially movably on the bush-like axle body 4. The portions 65, 66, 67 and 68 are integral parts of the abovementioned pressure device which also has here the pressure body 35, against which bears an additional sealing ring 69 which is stressed by the pressure of a hydraulic fluid provided in a delivery line 70 of the governor shaft 60.

The web portions 65 and the annular groove 66 of the thrust ring 67 consequently possess inclined faces, as a result of which a radial movement of the sections 25 takes place when the thrust ring is moved axially. When fluid pressure is applied, this results in a radial outward movement of the transverse rollers 17 for the purpose of effecting a frictional engagement between the transmission members 2 and 3.

Also provided is a cup spring 71 which bears, at one end, against the roller bearing 68 and, at the other end, against an adjustable stop 72. The stop 72 which can be adjusted by means of a thread on the axle body 4 limits the axial movement of the thrust ring 67 and, consequently, the radial outward movement of the resilient sections 25. It is evident that when the application of fluid pressure ceases the pressure body 35 is thereby relieved, the cup spring 71 pushes back the thrust ring 67 and thereby necessarily causes a radial inward movement of the sections 25, as a result of which the frictional engagement between the members 2 and 3 is eliminated. This is especially advantageous when the frictional engagement is eliminated at high speeds, since the centrifugal forces of the sections 25 are thereby effectively counteracted by means of the transverse rollers 17.

With regard to the bevel-gear combination 64, there are various possibilities for the further power take-off process, depending on whether an engine at the front or an engine at the rear and a longitudinal or transverse mounting are concerned. Four examples may be listed here:

1. a coaxial power take-off for a longitudinally mounted front engine is obtained by means of the gear 73;
2. an angular power take-off is obtained by means of the gear 74, for a longitudinally mounted front engine in the front-wheel drive of a motor vehicle or for a longitudinally mounted rear engine in the rear-wheel drive of an automobile;
3. a parallel power take-off for a transverse front or rear engine is obtained by means of the gear 75;
4. an angular power take-off is obtained by means of the gear 76 for a transverse front engine in a rear-wheel drive for an automobile.

It is noteworthy that no additional set of gears is necessary for each alternative engine mounting, but the bevel-gear combination 64 or the like is sufficient in every case.

In this exemplary embodiment, the infinitely variable speed control is carried out by turning the transmission member 2, by means of the governor shaft 60, about the longitudinal axis of the latter. FIG. 16 shows the maximum speed transmission, whilst FIG. 17 shows the opposite direction of rotation (for reversing), with approximately 13% of the maximum speed in one revolution of the governor shaft 60 and through 180°.

To obtain an optimum frictional engagement between the two transmission members in any relative position, it is appropriate to subject the hydraulic fluid to a constant control of its pressure. This can be carried out by using a computer. In so doing, the control can be effected as a function of the angular position of the first transmission member relative to the other transmission member and/or as a function of the desired amount of the contact pressure between the two transmission members in question. The latter option, in particular, is advantageous when overstraining of material is considered.

The transmission of speeds between transmission members of this type is known. If the axes of rotation of these two members lie on a common line, the speed ratio is one to one. If the pivotable transmission member is set at an angle, the speed of the output shaft decreases and is equal to zero when the axes of rotation are positioned at 90° to one another. If the pivotable transmission member is moved beyond 90°, which depends on the space still available, the speed increases again, but the direction of rotation of the output shaft is reversed.

Consequently, by means of the transmission designed as described above, the contact pressure between the transmission members 2 and 3 can be varied at random, resulting in the advantages already mentioned. The expression "at random" is also intended to mean that, when the transmission members are disengaged at high speed, according to the invention, by means of the pressure device in question, the spring device 71 contributes its share to this by opposing the centrifugal effect of the transmission member 2.

Although the use of a hydraulic fluid system as an adjusting drive for the axial position of the transverse rollers 17 was described above as preferred, the transverse rollers can also be moved electrically, magnetically, purely mechanically, thermally or by a combination of these means.

I claim:

1. An infinitely variable transmission, comprising a first transmission member having a transverse-roller rotatable carrier provided with freely rotatable transverse rollers which are arranged in a circle and which are non-rotatable in the direction of their engaging movement, the axis of rotation of said carrier passing through the center of said circle in an angle perpendicular to the plane of said circle, and a second transmission member having a spherically curved working face frictionally engaged by said transverse roller, means for connecting said first transmission member to an output shaft, and adjusting means for adjusting the positions of said first and second transmission members with respect to each other to obtain a desired speed of said output shaft, the improvement wherein the axial position of the transverse rollers on the transverse-roller carrier can be varied radially at random by a force exerted by control means located exteriorly of said transmission.

2. A transmission according to claim 1, wherein said transverse-roller carrier includes sections, support means for connecting radially and resiliently said sections to said carrier, and a controllable pressure device for interacting with said sections.

3. An infinitely variable transmission, comprising a first transmission member having a transverse-roller rotatable carrier provided with freely rotatable transverse rollers which are arranged in a circle and which are non-rotatable in the direction of their engaging movement, the axis of rotation of said carrier passing through the center of said circle in an angle perpendicular to the plane of said circle, and a second transmission member having a spherically curved working face frictionally engaged by said transverse rollers, means for connecting said first transmission member to an output shaft, and adjusting means for adjusting the positions of said first and second transmission members with respect to each other to obtain a desired speed of said output shaft, the improvement wherein the axial position of the transverse rollers on the transverse-roller carrier can be varied radially at random by a force exerted by control means located exteriorly of said transmission, wherein said transverse-roller carrier includes sections, support means for connecting radially and resiliently said sections to said carrier, and a controllable pressure device for interacting with said sections, wherein a portion of the pressure device and the sections have faces which are inclined to the axis of rotation of the transverse-roller carrier whereby the radial adjustment of the sections can be achieved.

4. A transmission according to claim 3, including a preferably adjustable restoring spring which, when the pressure device is relieved, applies a restoring force to restore the sections of the transverse-roller carrier.

5. A transmission according to claim 3, wherein the pressure device comprises a movable pressure body which can be stressed with a fluid, a roller bearing which can be moved axially by the pressure body, a thrust ring seated on a roller bearing and having an annular groove and web portions of the sections, the annular groove and web portions engaging loosely with one another and having inclined faces.

6. Transmission according to claim 3, characterized in that, for the purpose of establishing the force which provides the frictional engagement between the two transmission members, the pressure device which can be actuated from outside the transmission is positively controlled as a function of the respective angular position of the pivotable transmission member and of the desired contact pressure of the above-mentioned force.

7. Transmission according to claim 6, characterized in that a computer is provided for the control.

8. Transmission according to claim 3, characterized in that the second transmission member is used as a flywheel of a power engine.

* * * * *